(12) United States Patent
Soukri et al.

(10) Patent No.: US 10,232,344 B2
(45) Date of Patent: Mar. 19, 2019

(54) SOLID SORBENT MATERIALS FOR ACID-GAS SEPARATION

(71) Applicant: Research Triangle Institute, Research Triangle Park, NC (US)

(72) Inventors: Mustapha Soukri, Cary, NC (US); Luke Coleman, Durham, NC (US); Marty Lail, Raleigh, NC (US)

(73) Assignee: Research Triangle Institute, Research Triangle Park, NC (US)

( * ) Notice: Subject to any disclaimer, the term of this patent is extended or adjusted under 35 U.S.C. 154(b) by 45 days.

(21) Appl. No.: 15/326,214

(22) PCT Filed: Jul. 14, 2015

(86) PCT No.: PCT/US2015/040382
§ 371 (c)(1),
(2) Date: Jan. 13, 2017

(87) PCT Pub. No.: WO2016/011032
PCT Pub. Date: Jan. 21, 2016

(65) Prior Publication Data
US 2017/0197198 A1 Jul. 13, 2017

Related U.S. Application Data

(60) Provisional application No. 62/024,705, filed on Jul. 15, 2014.

(51) Int. Cl.
| | |
|---|---|
| *B01J 20/26* | (2006.01) |
| *B01D 53/02* | (2006.01) |
| *B01J 20/10* | (2006.01) |
| *B01J 20/30* | (2006.01) |
| *C08G 73/02* | (2006.01) |

(52) U.S. Cl.
CPC ............ *B01J 20/262* (2013.01); *B01D 53/02* (2013.01); *B01J 20/103* (2013.01); *B01J 20/3085* (2013.01); *C08G 73/0206* (2013.01); *C08G 73/0213* (2013.01); *B01D 2253/106* (2013.01); *B01D 2253/202* (2013.01); *B01D 2253/25* (2013.01); *B01D 2256/22* (2013.01); *B01D 2257/504* (2013.01); *B01D 2258/0283* (2013.01); *Y02C 10/08* (2013.01)

(58) Field of Classification Search
CPC ........................................................ B01J 20/10
See application file for complete search history.

(56) References Cited

U.S. PATENT DOCUMENTS

2015/0321167 A1    11/2015  Wang et al.

FOREIGN PATENT DOCUMENTS

JP       02-263707       * 10/1990

OTHER PUBLICATIONS

JP 02-263707 partial translation (1990).*
Epomine (https://www.shokubai.co.jp/en/products/functionality/pdf/epomin_e.pdf)(Date unknown).*
Chen et al., "Amine-Impregnated Silica Monolith with a Hierarchical Pore Structure: Enhancement of CO2 Capture Capacity," *Chem Commun.*, 2009, pp. 3627-3629.
Neville et al., "The Formation of Polyethyleneimine-Trimethoxymethylsilane Organic-Inorganic Hybrid Particles," *Colloids and Surfaces A: Physicochem. Eng. Aspects*, 2013, pp. 42-50.
Yuan et al., "Synthesis of Nanofiber-Based Silica Networks Mediated by Organized Poly(ethylene imine): Structure, Properties, and Mechanism," *Advanced Functional Materials*, 2006, vol. 16, pp. 2205-2212.

* cited by examiner

*Primary Examiner* — Kuo Liang Peng
(74) *Attorney, Agent, or Firm* — Womble Bond Dickinson (US) LLP (57) ABSTRACT

Solid sorbent materials have been prepared by combining polyethyleneimine (PEI) with silica precursors. The solid sorbent materials can be used, for example, for acid gas separation, gas purification, and water purification applications. Advantageously, such materials can be water stable and the capacity of such solid sorbent materials does not diminish substantially after repeated use and regeneration.

20 Claims, 4 Drawing Sheets

SOLID SORBENT MATERIALS FOR ACID-GAS SEPARATION

CROSS-REFERENCE TO RELATED APPLICATIONS

The present application is a U.S. National Stage of International Patent Application No. PCT/US2015/040382, filed Jul. 14, 2015, which claims priority to U.S. Provisional Application 62/024,705, filed Jul. 15, 2014, the disclosures of which are incorporated by reference herein in their entireties.

FEDERALLY SPONSORED RESEARCH OR DEVELOPMENT

The present invention was made with United States Government support under Grant No. DE-FE0007707, awarded by the U.S. Department of Energy (DOE). The government has certain rights in the invention.

FIELD OF THE INVENTION

The present invention relates to sorbent materials for the removal of specific components of gas streams, as well as devices and methods using such systems.

BACKGROUND OF THE INVENTION

Various strategies are being pursued to minimize the production and/or release of undesirable emissions from combustion processes. One such strategy is the development of technologies for the specific removal of acid gases from gas mixtures, such as the exhausts of carbon combustion processes. The separation of acid gases, such as $CO_2$, from gas mixtures has been carried out industrially for over a hundred years, although no known process has been used on a large scale such as that required by large, industrial power plants. Of the numerous processes used for $CO_2$ separation, current technology mainly focuses on the use of various solvents, such as alkali carbonates in the BENFIELD™ Process (UOP, LLC), alcoholamines in the ECONAMINE FG PLUS™ process (Fluor Corporation), and alcohols, diols, and ethers in the RECTISOL® process (Lurgi, GMBH) and the SELEXOL™ solvent (The Dow Chemical Company). In a typical solvent-based process, the gas mixture to be treated is passed through a liquid solvent that interacts with acidic compounds in the gas stream (e.g., $CO_2$ and $SO_2$) and separates them from non-acidic components. The liquid becomes rich in the acid-gas components, which are then removed under a different set of operating conditions so that the solvent can be recycled for additional acid-gas removal.

Other strategies for acid gas removal employ solid-phase sorbents. In some applications, solid phase sorbents are desirable, as they can provide various benefits, including typically requiring lower heat for regeneration. Solid phase sorbents generally employ porous materials (e.g., mesoporous silicates, zeolites, metal-organic-frameworks, and the like) that can selectively isolate acid gases such as $CO_2$. Addition of specific functional sites, such as amine sites, within such materials represents a means to increase the selectivity and absorption capacity of such solid phase sorbents. One such material can be obtained by associating a solid, porous material with an amine-containing polymer, such as polyethyleneimine (PEI).

PEI has been previously investigated for acid gas absorption and branched PEI in particular has a high theoretical capacity for acid gas absorption due to the number of primary and secondary amines in its molecular structure. For example, Wang et al. have prepared amine-modified materials via physical impregnation and chemical graft of polyethyleneimine (PEI) on different porous materials (see D. X. Wang et al., *Ind. Eng. Chem. Res.* 51(2012): 3018-3057); Xu et al. have described a PEI-modified mesoporous molecular sieve of MCM-41 type (MCM-41-PEI) (see X. C. Xu et al., *Energy Fuels*, 16 (2002): 1463-1469); Hicks et al. have studied a covalently tethered hyperbranched aminosilica (HAS) material (see J. C. Hicks et al., *J. Am. Chem. Soc.* 130 (2008): 2902-2903); Drese et al. have disclosed hyperbranched aminosilica (HAS) adsorbents prepared via the ring opening polymerization of aziridine in the presence of a mesoporous silica SBA-15 support (see J. H. Drese, *Adv. Funct. Mater.* 19 (2009): 3821-3232 and *Microporous Mesoporous Mater.* 151 (2012): 231-240). Many of the PEI-based solid sorbents prepared to date are not cost-effective to prepare and/or result in release/leaching of some percentage of the PEI in use.

One further challenge with the use of PEI is that it is highly soluble in water. Where gas streams to be treated are humid (i.e., comprise some degree of water), unattached PEI can readily leach from the porous material with which it is associated. Similarly, PEI that is tethered to a porous material may also leach from the porous material due to reaction between the water and the linkages between the PEI and the porous material, cleaving the PEI from the porous material. Accordingly, such strategies can lead to significant loss of effectiveness of the sorbent. It would be advantageous to formulate a solid phase sorbent capable of effectively removing acid gases from gas streams (particularly humid gas streams) over extended periods of use, regeneration, and reuse.

SUMMARY OF THE INVENTION

The present disclosure generally provides sorbent materials for the removal of acidic gases, such as $CO_2$, from a gas stream and methods for removing acidic gases using such sorbent materials. Various types of sorbent materials are described herein that are capable of functioning in this capacity.

In one aspect of the invention is provided a solid sorbent material comprising silica and a polymeric amine (e.g., polyethyleneimine), wherein the solid sorbent material has a carbon dioxide loading capacity that is stabilized, such that the carbon dioxide loading capacity is substantially unchanged (e.g., within about 30%, within about 20%, or within about 10% of the carbon dioxide loading capacity of the original solid sorbent material) after 50 cycles of $CO_2$ separation and regeneration (by heating). In another aspect is provided a solid sorbent material comprising a porous silica framework having polyethyleneimine structurally integrated within the porous silica framework. Such solid sorbent materials are advantageously water stable, as will be described further herein.

In various embodiments, the present solid sorbent materials can be defined by one or more of the following statements. Specifically, a solid sorbent material as described above may include one, two, or any number of the following characteristics in any combination.

The solid sorbent material carbon dioxide loading capacity after 50 cycles of $CO_2$ separation and regeneration can be within about 30%, within about 20%, or within about 10% that of the original (unused) solid sorbent material.

The mass of the solid sorbent material can change by less than about 10% or less than about 20% after 50 cycles of $CO_2$ separation and regeneration.

The solid sorbent material can have an elemental nitrogen content of at least about 10% by weight.

The elemental nitrogen content can be substantially unchanged (e.g., within about 30%, within about 20%, or within about 10% of the elemental nitrogen content of the original solid sorbent material) after 50 cycles of $CO_2$ separation and regeneration. For example, in one embodiment, the solid sorbent material can have an elemental nitrogen content of at least about 10% by weight and be substantially unchanged after 50 cycles of $CO_2$ separation and regeneration.

In one embodiment, a solid sorbent material is provided, comprising silica and a polymeric amine (e.g., polyethyleneimine), wherein the solid sorbent material has a carbon dioxide loading capacity that is stabilized, such that the carbon dioxide loading capacity is substantially unchanged (e.g., within about 30%, within about 20%, or within about 10% of the carbon dioxide loading capacity of the original solid sorbent material) after 50 cycles of $CO_2$ separation and regeneration (by heating), wherein the sorbent material is water stable.

In certain embodiments, a solid sorbent material is provided, comprising silica and a polymeric amine (e.g., polyethyleneimine), wherein the solid sorbent material has a carbon dioxide loading capacity that is stabilized, such that the carbon dioxide loading capacity is substantially unchanged (e.g., within about 30%, within about 20%, or within about 10% of the carbon dioxide loading capacity of the original solid sorbent material) after 50 cycles of $CO_2$ separation and regeneration (by heating), and wherein the mass of the solid sorbent material wherein the sorbent material changes by less than about 10% or less than about 20% after 50 cycles of $CO_2$ separation and regeneration, wherein the solid sorbent material is water stable.

In another aspect of the present disclosure is provided a method for the preparation of a solid sorbent material as described herein, comprising combining polyethyleneimine with a silica precursor under conditions in which the silica precursor can polymerize to produce silica. The method can comprise, for example, combining polyethyleneimine with a silica precursor, and polymerizing the silica precursor to form a porous silica framework having polyethyleneimine structurally integrated within the porous silica framework.

In various embodiments, the method can be defined by one or more of the following statements. Specifically, such method as described above may include one, two, or any number of the following characteristics in any combination.

The silica precursor can vary and, in certain embodiments, the silica precursor comprises one or more alkoxy silicates. For example, the alkoxy silicates can be selected from the group consisting of tetraethyl orthosilicate, 1,2-bis tetraethyl orthosilicate, tetramethyl orthosilicate, tetra-n-propyl silicate, tetra-isopropyl silicate, tetra-tert-butoxy silicate, tetra-phenoxy silicate, tetra-aryloxy silicate, tetra-naphthyloxy silicate, tetra-quinolynoxy silicate, 6,6'-spirobi[dibenzo[d,f][1,3,2]dioxasilepin, and combinations thereof, all of which can be substituted or unsubstituted.

The polyethyleneimine can be in branched or linear form and can have any molecular weight. In certain embodiments, the polyethyleneimine has a molecular weight of less than about 2500 Da or less than about 1000 Da. In certain embodiments, the polyethyleneimine can be an oligomer.

In some embodiments, the polyethyleneimine is in liquid form.

The polyethyleneimine and silica precursor can be combined under various conditions.

In some embodiments, the polyethyleneimine and silica precursor are provided in substantially a 1:1 molar ratio.

In some embodiments, the combining of the polyethyleneimine and silica precursor is at least partially carried out in the presence of a catalyst (e.g., an acidic catalyst or a basic catalyst). The use of a catalyst in certain embodiments may be beneficial to achieve a material having a high $CO_2$ loading capacity. Exemplary catalysts include, but are not limited to, nitric acid, hydrochloric acid, acetic acid, sulfuric acid, phosphoric acid, perchloric acid, formic acid, sodium hydroxide, potassium hydroxide, ammonia, ammonium hydroxide, and combinations thereof.

The reaction can, in certain embodiments, be at least partially carried out in the presence of a solvent, e.g., methanol, ethanol, propanol, isopropanol, acetone, acetonitrile, tetrahydrofuran, or a mixture of two or more such solvents.

In one embodiment, a method for the preparation of a solid sorbent material is provided, comprising combining polyethyleneimine with a silica precursor under conditions in which the silica precursor can polymerize to produce silica, wherein the combining of the polyethyleneimine and silica precursor is at least partially carried out in the presence of a catalyst.

In some embodiments, the polyethyleneimine and silica precursor are provided in substantially a 1:1 molar ratio and the combining of the polyethyleneimine and silica precursor is at least partially carried out in the presence of a catalyst.

BRIEF DESCRIPTION OF THE DRAWINGS

Having thus described the disclosure in the foregoing general terms, reference will now be made to the accompanying drawings, wherein:

DETAILED DESCRIPTION OF THE INVENTION

The present invention now will be described more fully hereinafter with reference to the accompanying drawings, in which some, but not all embodiments of the inventions are shown. Indeed, these inventions may be embodied in many different forms and should not be construed as limited to the embodiments set forth herein; rather, these embodiments are provided so that this disclosure will satisfy applicable legal requirements. Like numbers refer to like elements. As used in this specification and the claims, the singular forms "a," "an," and "the" include plural referents unless the context clearly dictates otherwise.

Figure 1A:
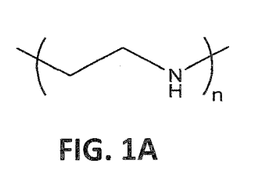
FIGS. 1A, 1B, and 1C are representative polyethyleneimine (PEI) polymeric structures.
Figures 1B, 1C:
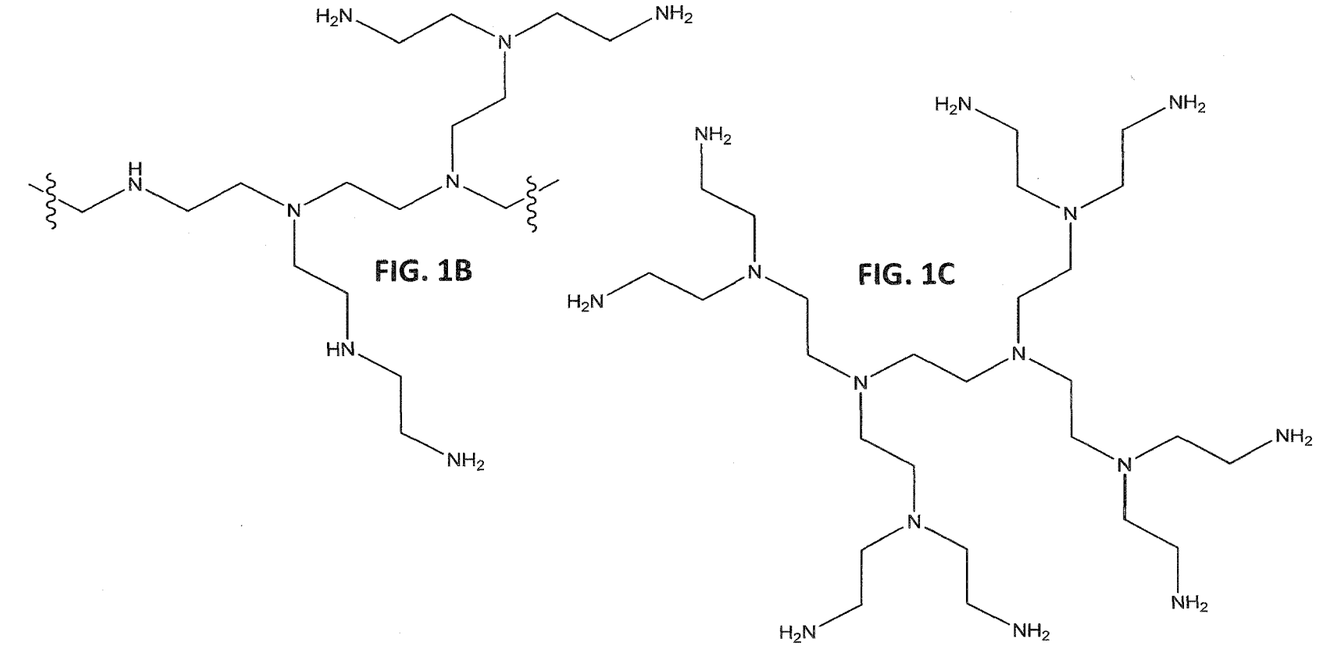

Solid sorbent materials comprising a polymer absorbent are provided according to the present disclosure. The polymer absorbent disclosed herein comprises a polymeric amine, e.g., polyethyleneimine (PEI). PEI is a polymer comprising a —$C_2H_5N$— repeating monomer unit. PEI can be in linear form or branched form (including dendritic form). Linear PEI consists of secondary amine groups as shown in FIG. 1A, whereas branched PEI can comprise secondary amine groups as well as primary and/or tertiary amine groups (wherein the ratio of primary:secondary:tertiary amines can vary). Exemplary portions of representative branched PEI and dendritic PEI are provided in FIGS. 1B and 1C, respectively.

Figure 2:
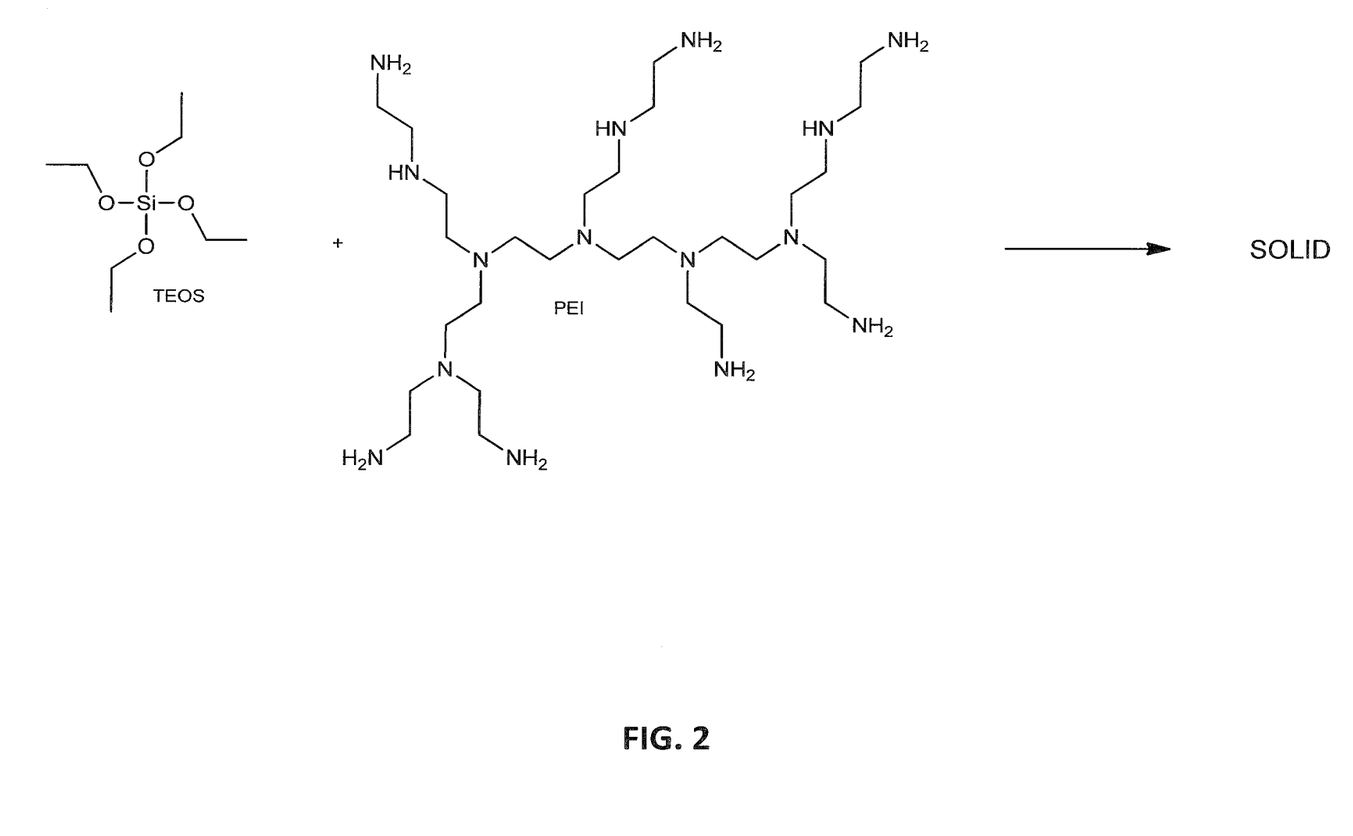
FIG. 2 is an exemplary reaction scheme, showing a reaction between an organosilane (here, TEOS) and a PEI to produce a solid.

In accordance with one aspect of the present disclosure, a solid sorbent material is prepared by combining a polymer absorbent (e.g., a polymeric amine) with a silica precursor as generally illustrated in the schematic presented in FIG. 2. Under appropriate conditions, which are described in further detail herein, the silica precursor can be polymerized to form a porous silica material and the PEI, which is present during the course of the polymerization, becomes incorporated within the structure. Although not intending to be limited by theory, it is believed that the PEI is integrated within the polymeric silica as it is being formed. More particularly, the PEI is incorporated into the framework of the porous polymeric silica as it is being formed. Current analysis (as further described herein) shows the integral combination of the PEI with the polymeric silica as the silica framework is being formed. Certain forms of PEI are liquids at room temperature and can advantageously form a solid sorbent material when reacted with silica precursors according to the methods disclosed herein. In other embodiments, PEI that is already in solid form is employed.

Exemplary silica precursors that are useful according to the invention include, but are not limited to, alkoxy silicates (e.g., tetraethyl orthosilicate (TEOS), 1,2-bis tetraethyl orthosilicate (1,2-bis TEOS), tetramethyl orthosilicate (TMOS), tetra-n-propyl silicate, and tetra-isopropyl silicate, tetra-tert-butoxy silicate), tetra-phenoxy silicate, tetra-aryloxy silicate, tetra-naphthyloxy silicate, tetra-quinolynoxy silicate, and 6'-spirobi[dibenzo[d,f][1,3,2]dioxasilepin. Such silica precursors can be substituted (e.g., with C1-3 alkyl, halo, and/or alkoxy substituents and the like) or can be unsubstituted.

The PEI that is employed in the reaction can be in any form (e.g., linear, branched, or dendritic). "PEI" as used herein is intended to cover all molecular weights, including oligomeric amines and long polymeric chain amines. Accordingly, "PEI" includes polymers as well as oligomeric polyamines. The average molecular weight of the PEI can vary but, in some embodiments, is generally less than about 5000 Da, e.g., less than about 2500 Da. In certain embodiments, high $CO_2$ capacity is noted for solid sorbent materials produced using PEI having a molecular weight of below about 1000 Da (e.g., between about 150 Da and about 1000 Da).

The amount of PEI relative to the amount of silica precursor used for the production of a solid sorbent material can vary and is generally that amount sufficient to produce a solid sorbent material capable of capturing some concentration of the desired compound(s) to be captured. In this regard, although any ratio of PEI to silica precursor can be used according to the present disclosure, certain ratio ranges are particularly preferred, as they have been shown to lead to solid sorbent materials that exhibit high nitrogen content and high capture efficiency (e.g., high loading of $CO_2$) in use. For example, the molar ratio of PEI to silica precursor can, in some embodiments, range from about 1:50 to about 10:1. In preferred embodiments, the molar ratio of PEI to silica precursor is about 0.5:1 to about 2:1, such as about 0.75:1 to about 1.25:1 (including a particularly preferred molar ratio of PEI to silica precursor of about 1:1, i.e., about a 1:1 molar stoichiometry).

Although not required, the reaction is typically conducted in a solvent. The type of solvent used can vary and is generally any solvent in which the PEI and silica precursor can interact to form a solid sorbent material as described herein. Preferably, the solvent is a solvent in which the PEI and silica precursor are soluble. Where a catalyst is employed, the solvent is commonly a solvent that is polar and/or miscible with water. Representative solvents include alcohols (e.g., methanol, ethanol, isopropanol), acetone, acetonitrile, tetrahydrofuran (THF) and the like, and mixtures and derivatives thereof. The reaction is generally conducted at ambient temperature (e.g., about 25° C.) under atmospheric conditions; however, these parameters can be varied (e.g., to modify the solubility of the PEI, silica precursor, and/or catalyst). Modifications of the temperature and/or pressure at which the reaction is conducted can, in some embodiments, lead to changes in polymerization reaction rate, which may provide control over the incorporation of PEI in the polymerized silica. For example, in certain embodiments, a lower temperature may provide for greater control over the polymerization reaction and may increase the amount of PEI within the solid sorbent material produced. Accordingly, in certain embodiments, the polymerization reaction is conducted at subambient temperatures (e.g., below about 25° C., such as below about 0° C., including as low as about 78° C.).

In some embodiments, a catalyst is used to facilitate the polymerization of the silica precursors. Although it is possible to produce the silicate materials described herein in the absence of a catalyst, use of a catalyst is generally preferred to promote the reaction. The catalyst used can vary and may be, for example, an acid or base catalyst. "Acid" and "base" are used herein to describe compounds that function as proton donors and proton acceptors, respectively. Acid catalysts include, but are not limited to, organic acids (i.e., carboxylic acids) and inorganic acids. Basic catalysts include, but are not limited to, organic bases (e.g., amines) and inorganic bases (e.g., metal hydroxides). In some embodiments, certain exemplary catalysts can be selected from the group consisting of nitric acid ($HNO_3$), hydrochloric acid (HCl), acetic acid (AcOH), sulfuric acid ($H_2SO_4$), phosphoric acid ($H_3PO_4$), perchloric acid ($HClO_4$), formic acid (HCOOH), sodium hydroxide (NaOH), potassium hydroxide (KOH), ammonia ($NH_3$), and ammonium hydroxide ($NH_4OH$). The amount and concentration of catalyst used in the reactions described herein can vary. Typically, a catalytic (e.g., substoichiometric) amount of catalyst is required.

The solid sorbent material thus produced is subsequently isolated, e.g., by filtration, centrifugation, or the like, to provide the solid sorbent material. The sorbent material can be washed (e.g., with water) to ensure removal of, e.g., excess unreacted reagent, solvent, and/or catalyst from the solid. The solid sorbent material can be described, in some embodiments, as a solid material comprising silica and PEI, which can be employed for capture of various components from water and/or gas sources.

Test data described herein indicates that the presently described solid sorbent is structurally distinguishable from known combinations of PEI and silica in that the PEI is incorporated into the framework of the pores of the silica. An exemplary solid material resulting from the condensation of the silica precursor in the presence of PEI is shown in the scanning electron microscope image of FIG. 3. This solid is obtained after filtering the precipitate from the reaction mixture and washing the solid with copious amounts of water. In preferred embodiments, the solid sorbent material is substantially insoluble in water.

The product is typically in the form of particles of various sizes, which can range from less than about 10 microns to larger than about 250 microns (including comprising particles of about 5 to about 500 microns, about 10 microns to about 250 microns, about 10 microns to about 100 microns, about 50 microns to about 250 microns, about 50 microns to about 150 microns, about 100 microns to about 250 microns, about 100 to about 200 microns). In certain embodiments, the average particle size is within the ranges noted above. The as-formed product can, in certain embodiments, comprise particles having a broad particle size distribution. For example, the product can comprise particles having particle sizes equivalent to the average particle size of the sample plus and/or minus about 5 microns, plus and/or minus about 10 microns, plus and/or minus about 25 microns, plus and/or minus about 50 microns, plus and/or minus about 100 microns, plus and/or minus about 150 microns, or plus and/or minus about 200 microns.

Figure 3:
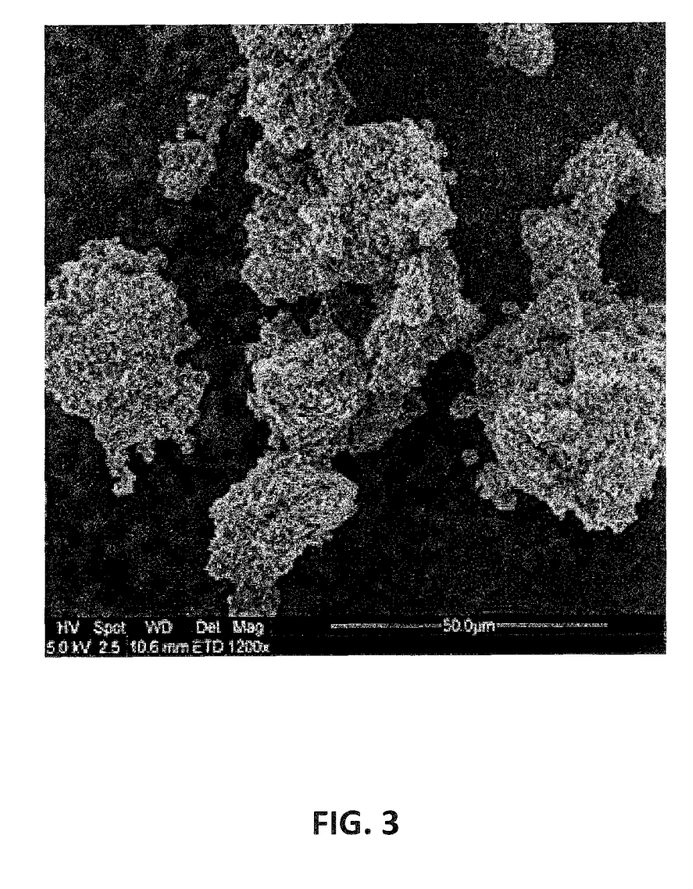
FIG. 3 is a scanning electron micrograph image of an exemplary solid material produced from an organosilane and PEI according to the present disclosure.

The particles in the image of FIG. 3 are irregularly shaped and have a broad particle size distribution. The random particle shape and substantially large particle size distribution are indicative of the incorporated nature of the product. In particular, it is believed that the condensing silica grows around the PEI oligomers and polymers and entangles PEI within the solid material. As such, the solid sorbent may be characterized as being a porous silica framework having PEI structurally integrated therein. Such structural integration is distinguishable from simple mixtures and is only believed to be achieved by the condensation of the silica framework in the presence of the PEI.

The solid sorbent material produced according to the methods disclosed herein can, in some embodiments, be analyzed to indicate the presence of PEI and evaluate the content of PEI in the solid sorbent material. For example, the solid sorbent material can be characterized by elemental analysis to determine the weight percent nitrogen (i.e., nitrogen atoms on PEI present as a component of the sorbent material). The solid sorbent materials described herein can, in certain embodiments, comprise at least about 5% nitrogen, at least about 8% nitrogen, or at least about 10% nitrogen. For example, certain solid sorbent materials according to the present disclosure can comprise about 5% to about 30% nitrogen, such as about 7% to about 25% nitrogen, about 10% to about 20% nitrogen, or about 10% to about 15% nitrogen.

The solid sorbent material produced according to the methods disclosed herein can, in some embodiments, be characterized by their carbon dioxide ($CO_2$) absorption/loading capacity. Solid sorbent materials as described herein can be described as having stabilized carbon dioxide loading capacities (e.g., wherein the carbon dioxide loading capacity does not vary significantly after multiple cycles of $CO_2$ separation and regeneration). Although not intending to be limited by theory, it is believed that the stabilized carbon dioxide loading capacity may result from the structural integration of the PEI within the porous silica framework. In certain embodiments, the structurally integrated PEI cannot be readily removed from the porous silica framework, absent destruction of the material (as contrasted with materials, for example, wherein PEI is simply present within the pores of a porous silica framework). Carbon dioxide loading capacity can be determined, for example, by mass balance, using a packed bed of solid and a feed gas containing an identified amount of $CO_2$ (e.g., where the feed gas comprises $CO_2$ in addition to $H_2O$, $O_2$, and $N_2$). The solid sorbent materials described herein can, in certain embodiments, exhibit at least about a 2% $CO_2$ loading by weight, at least about a 4% $CO_2$ loading by weight, at least about a 6% $CO_2$ loading by weight, or at least about a 8% $CO_2$ loading by weight, such as about 1% to about 25% $CO_2$ loading by weight, about 2% to about 15% $CO_2$ loading by weight, or about 5% to about 10% $CO_2$ loading by weight.

In preferred embodiments, the PEI remains a component of the solid sorbent material, even upon repeated use of the solid sorbent material and/or even after the solid sorbent material has been exposed to water. Again, the integrated nature of the PEI within the porous silica framework can be understood to explain this finding. Advantageously, in some embodiments, the solid sorbent materials described herein can exhibit nitrogen concentrations and the $CO_2$ loadings within the ranges disclosed above even after one or more cycles of use (i.e., after being employed to capture a given component from a gas or water source and washed to remove that component from the sorbent material). In preferred embodiments, the solid sorbent materials described herein can be described as substantially water stable. For example, in certain embodiments, the solid sorbent materials exhibit little to no change in one or more physical characteristics, such as percent nitrogen content, $CO_2$ loading, and mass, when subjected to water (e.g., when washed with water, used to treat a liquid comprising water, and/or used to treat a humid gas). The solid sorbent materials described herein can, in some embodiments, be described as exhibiting nitrogen concentrations and $CO_2$ loadings within the ranges disclosed above even after contact with water (in gas or liquid phase).

For example, in certain embodiments, the solid sorbent material exhibits a nitrogen concentration after 50 cycles of $CO_2$ separation and regeneration (by heating) of within about 30%, within about 20%, or within about 10% the nitrogen concentration of the original (unused) solid sorbent material. In some embodiments, the carbon dioxide loading capacity after 50 cycles of $CO_2$ separation and regeneration is described as substantially unchanged. For example, in some embodiments, the carbon dioxide loading capacity after 50 cycles of $CO_2$ separation and regeneration is within about 30%, within about 20%, or within about 10% that of the original (unused) solid sorbent material. In some embodiments, the solid sorbent material is reduced in mass after 50 cycles of $CO_2$ separation and regeneration by less than about 30% the initial mass, less than about 20% the initial mass, less than about 10% the initial mass, or less than about 5% the initial mass.

Advantageously, the solid sorbent materials described herein show unexpectedly high stability in water-containing (e.g., humid) conditions. For example, in certain embodiments, the solid sorbent material exhibits the nitrogen concentrations and carbon dioxide loading capacities noted above, even in the presence of water (e.g., when used to treat a humid gas stream). In fact, in some embodiments, the solid sorbent materials can exhibit such properties even after being washed with water.

The solid sorbent materials described herein can be employed for the capture of certain components in various ways. The sorbents described herein may, in certain embodiments, be used for the separation of acidic gases from gas mixtures. The term "acid gas" or "acidic gas" is intended to refer to any gas component that can result in formation of an acid when mixed with water. Non-limiting examples of acid gases encompassed by the present invention include $CO_2$, $SO_2$, COS, $CS_2$, NOx, HCl, mercaptans, and aldehydes (e.g., formaldehyde). For simplicity, the invention is described in the specification in relation specifically to $CO_2$. It is understood, however, that the present invention encompasses methods and systems for removal of any acid gas component from a gas stream. For example, in particular embodiments, the invention relates to a process for the removal of $CO_2$ from fossil fuel combustion flue gas, a natural gas mixture, or a mixture of respiration gases from closed environments containing $CO_2$. In some embodiments, the invention relates to the removal of volatile organic content (VOC) from gaseous streams. Such processes involves passing the mixed gas stream through solid sorbent material as described herein. Advantageously, the benefits described herein can be obtained even where the mixed gas stream is humid (i.e., comprises water).

The solid sorbent materials described herein may, in certain embodiments, be used in various other applications. They may, in some embodiments, be used to capture other components from gas streams, including impurities from combustion exhaust gases including coal-derived flue gas such as volatile metals. In a specific example, the solid sorbent materials described herein can be employed (e.g., in a guard bed) to eliminate trace heavy metal contaminants, such as aluminum, antimony, arsenic, barium, boron, cadmium, chromium, cadmium, cobalt, lead, mercury, molybdenum, selenium, and/or tellurium from an acid gas stream.

In other embodiments, the solid sorbent materials described herein can find use in water filtration and treatment, as they preferably can exhibit at least some degree of water stability. Exemplary uses in this regard include, but are not limited to, decreasing the total organic carbon (TOC) of water and decreasing the concentration of metals in water (e.g., selenium, tellurium, lead, copper, arsenic, mercury, and the like). Again, it is to be understood that the use of the solid sorbent materials disclosed herein is described in relation specifically to $CO_2$. It is understood, however, that the present invention encompasses methods and systems for removal of other components from gas and liquid sources, as noted above.

The solid sorbent materials of the present disclosure can advantageously exhibit reversible capture of such components. In preferred embodiments, the $CO_2$ and/or other component(s) captured using the solid sorbent material of the present invention may be released to regenerate the solid sorbent material for reuse. In certain embodiments, the solid sorbent materials are regenerable in that the acidic gases or other components captured thereby can be released from the solid sorbent material, and the solid sorbent material can be reused to separate additional components from further gas or liquid mixtures. It is preferred that the solid sorbent material is regenerable (or reaction with the $CO_2$ is reversible) under mild conditions (e.g., at a low temperature). In some embodiments, the release of $CO_2$ (and/or other component(s)) and corresponding regeneration of the solid sorbent material is effectuated by heating the solid sorbent material. When the solid sorbent material containing bound $CO_2$ is heated, the chemical reaction that initially bound the $CO_2$ to the PEI of the solid sorbent material can be reversed and the $CO_2$ is released. In certain embodiments, regeneration can be conducted, for example, by heating the solid sorbent material.

In certain embodiments, at or about 100% of the $CO_2$ is removed from the solid sorbent material after use. However, in other embodiments, less than 100% of the $CO_2$ (and/or other component(s)) is removed from the solid sorbent material after use. In preferred embodiments, about 50 to 100% of the captured $CO_2$ is removed from the solid sorbent material after use, preferably about 75% to 100%, about 80% to 100%, about 90% to 100%, about 95% to 100%, or about 98% to 100%. For example, in some embodiments, at least about 98%, 95%, 90%, 85%, 80%, 75%, 70%, 60%, or 50% of the captured $CO_2$ is removed from the solid sorbent material after use.

EXPERIMENTAL SECTION

Example 1: Preparation of TEOS-Based Sorbent

A round bottom flask was charged with PEI (56.4 g, 0.094 mmol) and TEOS (21.0 mL, 0.094 mmol) at room temperature under an inert nitrogen atmosphere. The resulting mixture was vigorously stirred for 15 minutes and then MeOH (15 mL) was added. The resulting milky mixture was stirred for 10 minutes and then $NH_4OH$ (10 mL of a 0.5N solution in water) was added. The addition resulted in an exothermic reaction (increasing the temperature of the mixture to about 35° C.) and, after about 15 minutes, the viscosity of the mixture increased sharply, resulting in the formation of a gel. More MeOH (15 mL) was added to facilitate stirring and the slurry was stirred at room temperature overnight. The mixture was filtered and the obtained solid was washed with water (250 mL). The amount of water used for washing was 5 times the amount of PEI and it was noted that contact of the PEI with water was exothermic (about 35° C.). Subsequently, the solid was washed with MeOH (50 mL) and the solid was dried overnight on high vacuum at about 80° C.

Example 2: Effect of PEI:TEOS Ratio

TEOS and PEI were combined according to the process of Example 1 with the exception that the PEI:TEOS ratio and the order of addition of reagents were varied according to Table 1, below. The resulting solid was evaluated for nitrogen content by elemental analysis and then subjected to testing to evaluate the $CO_2$ loading of the material. $CO_2$ loading was measured by mass balance and evaluated by providing approximately 2 grams of solid and contacting the solid with a feed gas containing 14.7% $CO_2$, 5.65% $H_2O$, 2.61% $O_2$, and balance nitrogen (wherein $CO_2$ content of the feed gas was analyzed by infrared $CO_2$ detector and nitrogen content was analyzed by a CHONS analyzer). The results of these tests are presented below in Table 1.

TABLE 1

Comparison of PEI and TEOS Molar Ratios

| PEI:TEOS | Order of addition | Nitrogen content in solid (% by weight) | $CO_2$ Loading (%) |
|---|---|---|---|
| 0.5:1 | PEI and TEOS mixed together before adding solvent and catalyst | 12.3 | 2.54 |
| 1:1 | PEI added as the last reagent | 14.0 | 4.64 |
| 1:1 | PEI and TEOS mixed together before adding solvent and catalyst | 15.8 | 6.43 |
| 2:1 | PEI and TEOS mixed together before adding solvent and catalyst | 10.6 | 1.92 |

As demonstrated by the data in Table 1, the percentage of nitrogen in the solid material showed a correlation with $CO_2$ loading (i.e., a higher nitrogen percentage in the solid material leads to a higher $CO_2$ loading). As shown, the highest nitrogen content and the highest $CO_2$ loadings are obtained for a 1:1 molar ratio of PEI:TEOS.

Example 3: Effect of Organosilicate Precursor Makeup

PEI was combined with various organosilicates according to the method of Example 1, wherein the specific silica precursor and the order of addition of reagents was varied according to Table 2, below, with the PEI and silica precursor provided in a 1:1 molar ratio in the presence of HCl. The resulting solids were evaluated for nitrogen content and then subjected to testing to evaluate the $CO_2$ loading of the material, as described in Example 1. The results of these tests are presented below in Table 2.

TABLE 2

Comparison of Silica Sources

| Silicate Reagent | Order of addition | Nitrogen content in solid (% by weight) | $CO_2$ Loading (%) |
| --- | --- | --- | --- |
| TEOS | PEI and TEOS mixed together before adding solvent and catalyst | 14.0 | 4.64 |
| 1,2-bis-TEOS | PEI added as the last reagent | 14.5 | 5.54 |
| 1,2-bis-TEOS | PEI and 1,2-bis-TEOS mixed together before adding solvent and catalyst | 6.5 | 3.9 |

As demonstrated by the data in Table 2, both TEOS and 1,2-bis-TEOS can be used to form solids exhibiting relatively high nitrogen content and relatively high $CO_2$ loading.

Example 4: Effect of PEI Molecular Weight

TEOS was combined with PEI of various molecular weights in a 1:1 molar ratio in the presence of HCl to study the effects of PEI molecular weight according to the method of Example 1. The resulting solids were evaluated for nitrogen content and then subjected to testing to evaluate the $CO_2$ loading of the material as described in Example 1. The results of these tests are presented below in Table 3.

TABLE 3

Comparison of PEI Molecular Weight

| PEI Molecular Weight | Nitrogen content in solid (% by weight) | $CO_2$ Loading (%) |
| --- | --- | --- |
| 600 Da | 15.8 | 6.43 |
| 1800 Da | 23.9 | 1.92 |

As demonstrated by the data in Table 3, the higher molecular weight PEI provided a solid sorbent material having a higher nitrogen content; however, the lower molecular weight PEI provided a solid sorbent material having a greater $CO_2$ loading.

Example 5: Effect of Solvent

TEOS was combined with PEI in a 1:1 molar ratio in various solvents in the presence of HCl to study the effects of reaction solvent. The resulting solids were evaluated for nitrogen content and then subjected to testing to evaluate the $CO_2$ loading of the material. The results of these tests are presented below in Table 4.

TABLE 4

Comparison of Reaction Solvent

| Solvent | Nitrogen content in solid (% by weight) | $CO_2$ Loading (%) |
| --- | --- | --- |
| MeOH | 15.8 | 6.43 |
| 2-PrOH | 18.4 | 7.15 |
| EtOH | 16.3 | 3.92 |

This data indicates that a range of alcohols can be used successfully in preparing the solid sorbent materials described herein, providing solids with high nitrogen contents.

Example 6: Effect of Catalyst

TEOS was combined with PEI in a 1:1 molar ratio with various acid and base catalysts to study the effects of catalyst identity according to the method of Example 1. The resulting solids were evaluated for nitrogen content and then subjected to testing to evaluate the $CO_2$ loading of the material as described in Example 1. The results of these tests are presented below in Table 5.

TABLE 5

Comparison of Catalyst

| Catalyst | Nitrogen content in solid (% by weight) | $CO_2$ Loading (%) |
| --- | --- | --- |
| HCl | 15.8 | 6.43 |
| $NH_4OH$ | 18.3 | 8.95 |
| NaOH | 12.5 | 7.0 |
| AcOH | 10.1 | 3.21 |
| $HNO_3$ | 17.1 | 6.87 |

As evidenced by the data in Table 5, all tested catalysts led to a material exhibiting at least about 10% nitrogen content by weight, capable of at least some degree of $CO_2$ loading. The data indicates that use of $NH_4OH$ as a catalyst led to a material with the highest $CO_2$ loading of those tested and use of AcOH as a catalyst led to a material with the least $CO_2$ loading of those tested.

Example 7: Effect of Order of Addition

TEOS was combined with PEI in a 1:1 ratio in different orders to study the effects of reaction solvent. The resulting solids were evaluated for nitrogen content and then subjected to testing to evaluate the $CO_2$ loading of the material as described in Example 1. The results of these tests are presented below in Table 6.

TABLE 6:

Comparison of Order of Addition

| Order of Addition | Nitrogen content in solid (% by weight) | $CO_2$ Loading (%) |
|---|---|---|
| 1) TEOS + catalyst combined in MeOH<br>2) PEI added | 14.0 | 4.64 |
| 1) TEOS + PEI combined in MeOH<br>2) Catalyst added | 15.8 | 6.43 |

This data indicates that the order of addition is important to obtaining a material with a higher $CO_2$ loading. Specifically, a higher $CO_2$ loading is obtained when the reagents (PEI and TEOS) are combined together first and the catalyst is subsequently added to the reagent mixture.

Example 8: Characterization of Porosity

Selected solid materials were characterized to determine the surface and pore properties. Specifically, the first entry in Table 7 was prepared using TEOS and PEI in MeOH with HCl as the catalyst and the second entry in Table 7 was prepared using TEOS and PEI in MeOH with $NH_4OH$ as the catalyst. These materials were the materials of Example 6, above.

The resulting solids were evaluated for nitrogen content and then subjected to testing to evaluate the $CO_2$ loading of the material as described in Example 1. The Brunauer, Emmett and Teller (BET) surface area value for each material was obtained according to Brunauer, S.; Emmett, P. H.; Teller, E. *Journal of the American Chemical Society* 1938, 60, 309, which is incorporated herein by reference. The pore volume (P.V). value was obtained by Barrett, E. P.; Joyner, L. G.; Halenda, P. P. *The Volume and Area Distributions in Porous Substances* 1951, 73, 373, which is incorporated herein by reference. The pore size (P.S.) value was obtained by Lowell, S.; Shields, J. E.; Thomas, M. A.; Thommes, M. *Characterization of Porous Solids and Powders: Surface Area, Pore Size and Density*; Kluwer Academic Publisher: Dordrecht, 2004, Springer 2006, which is incorporated herein by reference. The results of these tests are presented below in Table 7.

TABLE 7

Comparison of Order of Addition

| Sample | Nitrogen content in solid (% by weight) | Brunauer, Emmett and Teller (BET) Value ($m^2/g$) | P.V. ($cm^3/g$) | P.S. (nm) | $CO_2$ Loading (%) |
|---|---|---|---|---|---|
| Material from Example 6 prepared with HCl as catalyst | 15.8 | 7.02 | 0.0068 | 3.89 | 6.64 |
| Material from Example 6 prepared with $NH_4OH$ as catalyst | 18.3 | 7.24 | 0.0064 | 3.57 | 8.95 |

This data indicates that the order of addition is important to obtaining a material with a higher $CO_2$ loading. Specifically, a higher $CO_2$ loading is obtained when the reagents (PEI and TEOS) are combined together first and the catalyst is subsequently added to the reagent mixture.

Example 9: Capacity for $CO_2$ Separation

Figure 4:
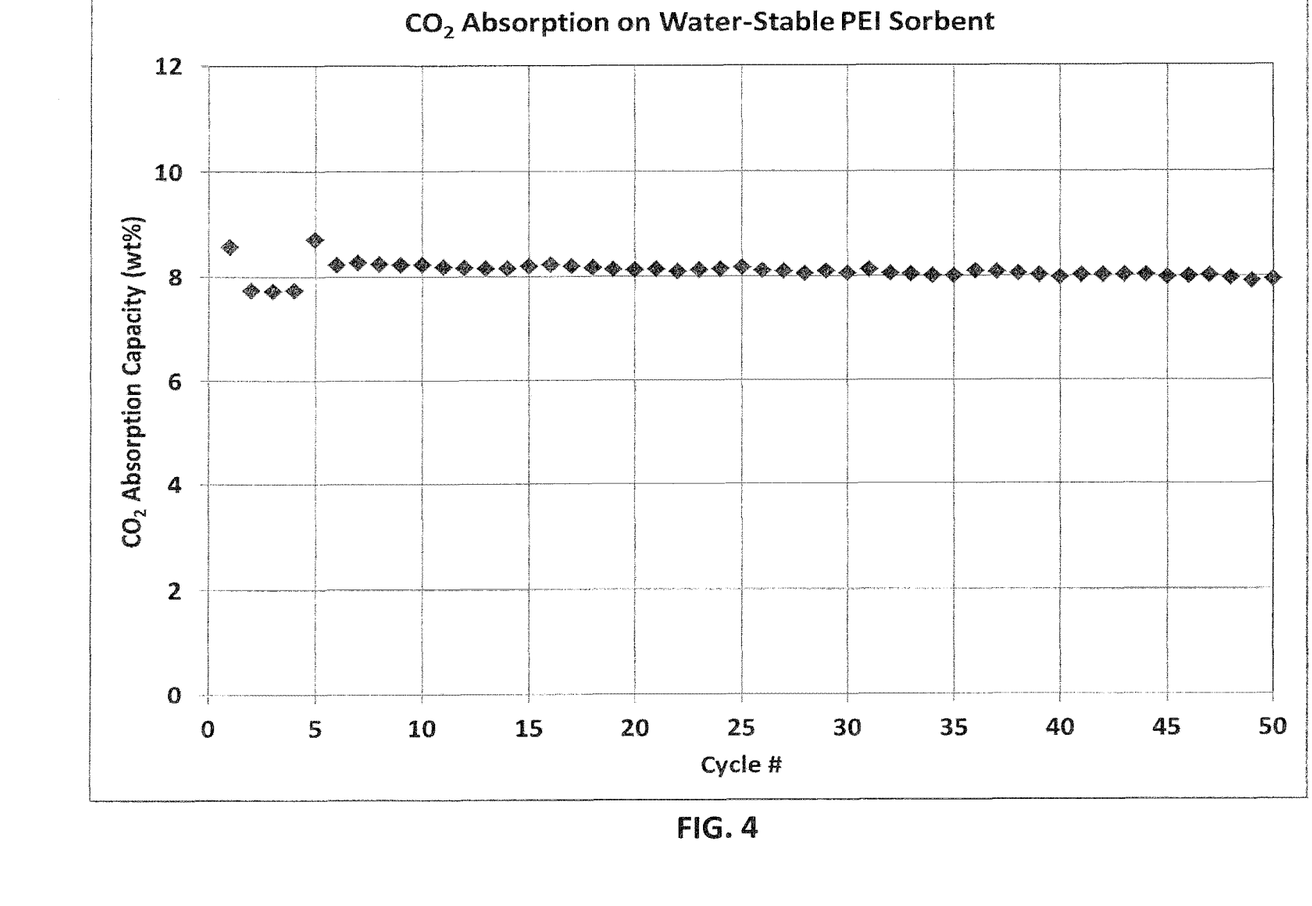
FIG. 4 is a graph indicating the $CO_2$ absorption capacity of an exemplary sorbent of the present disclosure over multiple cycles of use, regeneration and reuse.

A sample of material prepared according to Example 1, above, was placed in a packed bed reactor and was subjected to a feed gas containing 14.7% $CO_2$, 5.65% $H_2O$, 2.61% $O_2$, and balance $N_2$. The material maintained its capacity for $CO_2$ separation, with a $CO_2$ loading capacity of about 8 weight percent $CO_2$ sorption observed over 50 cycles. A graph demonstrating the capacity of the material at each cycle is provided in FIG. 4 of the application. As shown in FIG. 4, the loading capacity did not significantly diminish over time.

Many modifications and other embodiments of the inventions set forth herein will come to mind to one skilled in the art to which these inventions pertain having the benefit of the teachings presented in the foregoing descriptions and the associated drawings. Therefore, it is to be understood that the inventions are not to be limited to the specific embodiments disclosed and that modifications and other embodiments are intended to be included within the scope of the appended claims. Although specific terms are employed herein, they are used in a generic and descriptive sense only and not for purposes of limitation.

The invention claimed is:

1. A solid sorbent material comprising silica and polyethyleneimine, wherein the solid sorbent material has a carbon dioxide loading capacity that is stabilized such that the carbon dioxide loading capacity is within about 30% of the carbon dioxide loading capacity of the original solid sorbent material after 50 cycles of $CO_2$ separation and regeneration, and wherein the solid sorbent material is water stable, wherein the material has an elemental nitrogen content of at least about 10% by weight.

2. The solid sorbent material of claim 1, wherein said carbon dioxide loading capacity is within about 20% of the carbon dioxide loading capacity of the original solid sorbent material after 50 cycles of $CO_2$ separation and regeneration.

3. The solid sorbent material of claim 1, wherein said carbon dioxide loading capacity is within about 10% of the carbon dioxide loading capacity of the original solid sorbent material after 50 cycles of $CO_2$ separation and regeneration.

4. The solid sorbent material of claim 1, wherein the mass of the solid sorbent material changes by less than about 10% after 50 cycles of $CO_2$ separation and regeneration.

5. The solid sorbent material of claim 1, wherein the mass of the solid sorbent material changes by less than about 20% after 50 cycles of $CO_2$ separation and regeneration.

6. The solid sorbent material of claim 1, wherein the elemental nitrogen content is within about 30% of the elemental nitrogen content of the original solid sorbent material after 50 cycles of $CO_2$ separation and regeneration.

7. The solid sorbent material of claim 1, wherein the elemental nitrogen content is within about 20% of the elemental nitrogen content of the original solid sorbent material after 50 cycles of $CO_2$ separation and regeneration.

8. A solid sorbent material comprising a porous silica framework having polyethyleneimine structurally integrated within the porous silica framework,
wherein the material has an elemental nitrogen content of at least about 10% by weight.

9. A method for the preparation of a solid sorbent material, comprising combining polyethyleneimine with a silica precursor, and polymerizing the silica precursor to form a porous silica framework having polyethyleneimine structurally integrated within the porous silica framework,
wherein the polyethyleneimine and silica precursor are provided in substantially a 1:1 molar ratio.

10. The method of claim 9, wherein the silica precursor comprises one or more alkoxy silicates.

11. The method of claim 10, wherein the one or more alkoxy silicates are selected from the group consisting of optionally substituted tetraethyl orthosilicate, 1,2-bis tetraethyl orthosilicate, tetramethyl orthosilicate, tetra-n-propyl silicate, tetra-isopropyl silicate, tetra-tert-butoxy silicate, tetra-phenoxy silicate, tetra-aryloxy silicate, tetra-naphthyloxy silicate, tetra-quinolynoxy silicate, 6,6'-spirobi[dibenzo[d,f][1,3,2]dioxasilepin, and combinations thereof.

12. The method of claim 9, wherein the polyethyleneimine is in liquid form.

13. The method of claim 9, wherein the polyethyleneimine has a molecular weight of less than about 2500 Da.

14. The method of claim 9, wherein the polyethyleneimine has a molecular weight of less than about 1000 Da.

15. The method of claim 9, wherein the polyethyleneimine is in branched form.

16. The method of claim 9, wherein the combining of the polyethyleneimine and silica precursor is at least partially carried out in the presence of a catalyst.

17. The method of claim 16, wherein the catalyst is an acidic catalyst or a basic catalyst.

18. The method of claim 17, wherein the catalyst is selected from the group consisting of nitric acid, hydrochloric acid, acetic acid, sulfuric acid, phosphoric acid, perchloric acid, formic acid, sodium hydroxide, potassium hydroxide, ammonia, ammonium hydroxide, and combinations thereof.

19. The method of claim 9, wherein the combining is at least partially carried out in the presence of a solvent.

20. The method of claim 19, wherein the solvent is selected from the group consisting of methanol, ethanol, propanol, isopropanol, acetone, acetonitrile, tetrahydrofuran, and mixtures thereof.

* * * * *